(12) United States Patent
Kirschner et al.

(10) Patent No.: US 10,082,412 B2
(45) Date of Patent: Sep. 25, 2018

(54) COFFEE DOSING SYSTEM

(75) Inventors: Jonathan Kirschner, Powder Springs, GA (US); Larry J. Mattson, Charlotte, NC (US)

(73) Assignee: The Coca-Cola Company, Atlanta, GA (US)

( * ) Notice: Subject to any disclaimer, the term of this patent is extended or adjusted under 35 U.S.C. 154(b) by 1217 days.

(21) Appl. No.: 11/162,178

(22) Filed: Aug. 31, 2005

(65) Prior Publication Data

US 2007/0044665 A1   Mar. 1, 2007

(51) Int. Cl.
*G01F 11/10* (2006.01)
*G01F 11/18* (2006.01)
*A47J 31/40* (2006.01)

(52) U.S. Cl.
CPC ............. *G01F 11/18* (2013.01); *A47J 31/404* (2013.01)

(58) Field of Classification Search
CPC ................................ G01F 11/18; A47J 31/404
USPC .......................................... 222/361, 342–362
See application file for complete search history.

(56) References Cited

U.S. PATENT DOCUMENTS

| | | | |
|---|---|---|---|
| 317,676 A | 5/1885 | Schombel | |
| 1,485,032 A | 2/1924 | Janes | |
| 1,770,576 A | 7/1930 | Leather | |
| 1,904,756 A * | 4/1933 | Wooster | 222/336 |
| 2,207,120 A * | 7/1940 | Greig | 222/202 |
| 2,240,030 A * | 4/1941 | Bobrick et al. | 222/231 |
| 2,358,913 A * | 9/1944 | Dobkin | 222/39 |
| 2,553,509 A * | 5/1951 | Altorfer, Jr. | 222/361 |
| 3,011,683 A | 12/1961 | Nelson et al. | |
| 3,056,532 A * | 10/1962 | Germano | 222/361 |
| 3,185,190 A * | 5/1965 | Crawford | 141/360 |
| 3,347,425 A * | 10/1967 | Beushausen et al. | 222/305 |
| 3,446,403 A | 5/1969 | Serio | 222/158 |
| 3,623,639 A * | 11/1971 | McShirley | 222/108 |
| 3,955,718 A | 5/1976 | Von Holdt et al. | |
| 4,106,535 A * | 8/1978 | Davis | 141/88 |
| 4,168,019 A * | 9/1979 | Hausam | 222/185.1 |
| 4,230,239 A * | 10/1980 | Birrell | 222/440 |
| 4,322,017 A * | 3/1982 | Lowdermilk | 222/43 |
| 4,375,335 A * | 3/1983 | Klein-Albenhausen | 366/15 |
| 4,403,715 A | 9/1983 | Ludovissie | 222/361 |
| 4,610,378 A | 9/1986 | Grossi | |
| 4,653,674 A * | 3/1987 | Kihara et al. | 222/342 |
| 4,793,529 A * | 12/1988 | Krauss et al. | 222/637 |

(Continued)

FOREIGN PATENT DOCUMENTS

| | | | |
|---|---|---|---|
| DE | 940 5814 U | 8/1994 | |
| EP | 431885 | * 6/1991 | 222/212 |

(Continued)

*Primary Examiner* — Lien Ngo
(74) *Attorney, Agent, or Firm* — Eversheds Sutherland (US) LLP

(57) ABSTRACT

The present application describes a material dosing system. The material dosing system may include a material source and a dosing block. The dosing block may include a first aperture positioned on a first side and a second aperture positioned on a second side. The dosing block further may include a sliding plate positioned between the first side and the second side and having a dosing aperture movable between the first aperture and the second aperture. A coupling may connect the material source and the first aperture of the dosing block.

18 Claims, 2 Drawing Sheets

(56) References Cited

U.S. PATENT DOCUMENTS

| | | | |
|---|---|---|---|
| 4,836,424 A | 6/1989 | Afshar | 222/279 |
| 4,856,681 A * | 8/1989 | Murray | 222/158 |
| 4,925,065 A * | 5/1990 | Golias | 222/189.06 |
| 4,964,546 A * | 10/1990 | Morrow et al. | 222/352 |
| 4,989,380 A * | 2/1991 | Krauss | 52/197 |
| 5,046,643 A * | 9/1991 | Dumbaugh | 222/161 |
| 5,086,818 A | 2/1992 | Bendt | 141/358 |
| RE34,382 E | 9/1993 | Newnan | |
| 5,381,967 A | 1/1995 | King | |
| 5,421,491 A * | 6/1995 | Tuvim et al. | 222/336 |
| 5,497,713 A * | 3/1996 | Anderson et al. | 111/92 |
| D378,650 S | 4/1997 | Wong | D7/397 |
| 5,685,461 A * | 11/1997 | Mitchell | 222/184 |
| 5,875,935 A * | 3/1999 | Koch et al. | 222/200 |
| 5,908,144 A | 6/1999 | Dalton | |
| 5,927,558 A | 7/1999 | Bruce | 222/185 |
| 5,967,383 A | 10/1999 | Hidalgo | 222/516 |
| 6,382,470 B1 | 5/2002 | Hu et al. | |
| 6,450,371 B1 | 9/2002 | Sherman et al. | 222/516 |
| 6,732,772 B2 | 5/2004 | Woodruff | 141/346 |
| 6,749,091 B2 * | 6/2004 | Connelly et al. | 222/361 |
| 6,811,061 B2 * | 11/2004 | Tuvim | 222/361 |
| 6,962,274 B1 * | 11/2005 | Sherman | 222/361 |
| 2003/0089368 A1 * | 5/2003 | Zhao | 128/200.23 |
| 2007/0210120 A1 | 9/2007 | Kirschner | |

FOREIGN PATENT DOCUMENTS

| | | |
|---|---|---|
| EP | 1591055 A1 | 11/2005 |
| FR | 2791545 A1 | 3/1999 |
| GB | 312771 | 6/1929 |
| WO | 02075260 A1 | 9/2002 |
| WO | 03/082065 | 10/2003 |

* cited by examiner

COFFEE DOSING SYSTEM

TECHNICAL FIELD

The present invention relates generally to automatic coffee brewing machines and more particularly relates to a coffee brewing machine with a coffee dosing system.

BACKGROUND OF THE INVENTION

Fully automatic coffee brewing machines are known. These brewing machines generally store whole coffee beans in a hopper on top of a coffee brewing device. The user generally selects the type of coffee desired, i.e., espresso, cappuccino, latte, etc., and the machine grinds the beans from the hopper. The machine then drops the ground beans into a brewing chamber, compresses the grounds to create a brewable coffee block, and brews the block by forcing high pressure hot water therethrough.

These known automatic coffee brewing machines, however, may have several drawbacks. For example, if the beans are left in the hopper for more than a few days, the beans tend to lose their freshness and may go stale. Further, the grinders used in these machines may not be suitable for grinding coffee as finely as desired for certain types of beverages such as espresso. Adequate espresso grinds generally require constant adjustment so as to provide a "Barista" quality beverage. Such adjustments, however, may not be practical and, in fact, may defeat the purpose of an automatic brewer.

Finally, known automatic devices may tend to clog and/or provide more or less of a dose of coffee as may be desired. The ultimate result may be a beverage with an unsatisfactory taste.

There is a desire, therefore, for an automatic coffee brewing machine that provides fresh, properly dosed coffee and other types of brewed beverages in a fast and efficient manner. The machine preferably should be adaptable to various types of beverages.

SUMMARY OF THE INVENTION

The present application thus describes a material dosing system. The material dosing system may include a material source and a dosing block. The dosing block may include a first aperture positioned on a first side and a second aperture positioned on a second side. The dosing block further may include a sliding plate positioned between the first side and the second side and having a dosing aperture movable between the first aperture and the second aperture. A coupling may connect the material source and the first aperture of the dosing block.

The material source may include a source of ground coffee positioned within a gas impermeable container. The material source may include nitrogen therein. The dosing aperture may include a predetermined size. The coupling may include a first member connected to the material source and a second member connected to the dosing block. The coupling may include a reverse taper in the direction of the dosing block.

The dosing system further may include a vibration system. The vibration system may include a pair of arms positioned about the material source. The dosing system also may include an exit conduit positioned about the second aperture of the dosing block.

The present application further describes a coffee dosing system. The coffee dosing system may include a coffee source and a dosing block. The dosing block may include a first aperture positioned on a first side and a second aperture positioned on a second side. The dosing block further may include a sliding plate positioned between the first side and the second side. The sliding plate may include a dosing aperture movable between the first aperture and the second aperture. A coupling may connect the coffee source and the first aperture of the dosing block. The coupling may include a reverse taper in the direction of the dosing block.

The coffee source may include a gas impermeable container. The dosing system further may include a vibration system. The vibration system may include a pair of arms positioned about the coffee source.

The present application further describes a method of dosing a predetermined amount of coffee grinds. The method may include the steps of storing the coffee grinds, flowing the predetermined amount of the coffee grinds into a dosing aperture, and sliding the predetermined amount of the coffee grinds within the dosing aperture from a first position to a second position.

The storing step may include storing the coffee grinds in an air impermeable container. The first position may include a storage position and the second position may include an exit position. The flowing step may include flowing the predetermined amount of the coffee grinds into the dosing aperture via a reverse taper coupling. The method further may include the step of vibrating the coffee grinds. The method may include a number of flowing and sliding steps.

These and other features of the present invention will become apparent upon review of the following detailed description when taken in conjunction with the drawings and the appended claims.

DETAILED DESCRIPTION

Figure 1:
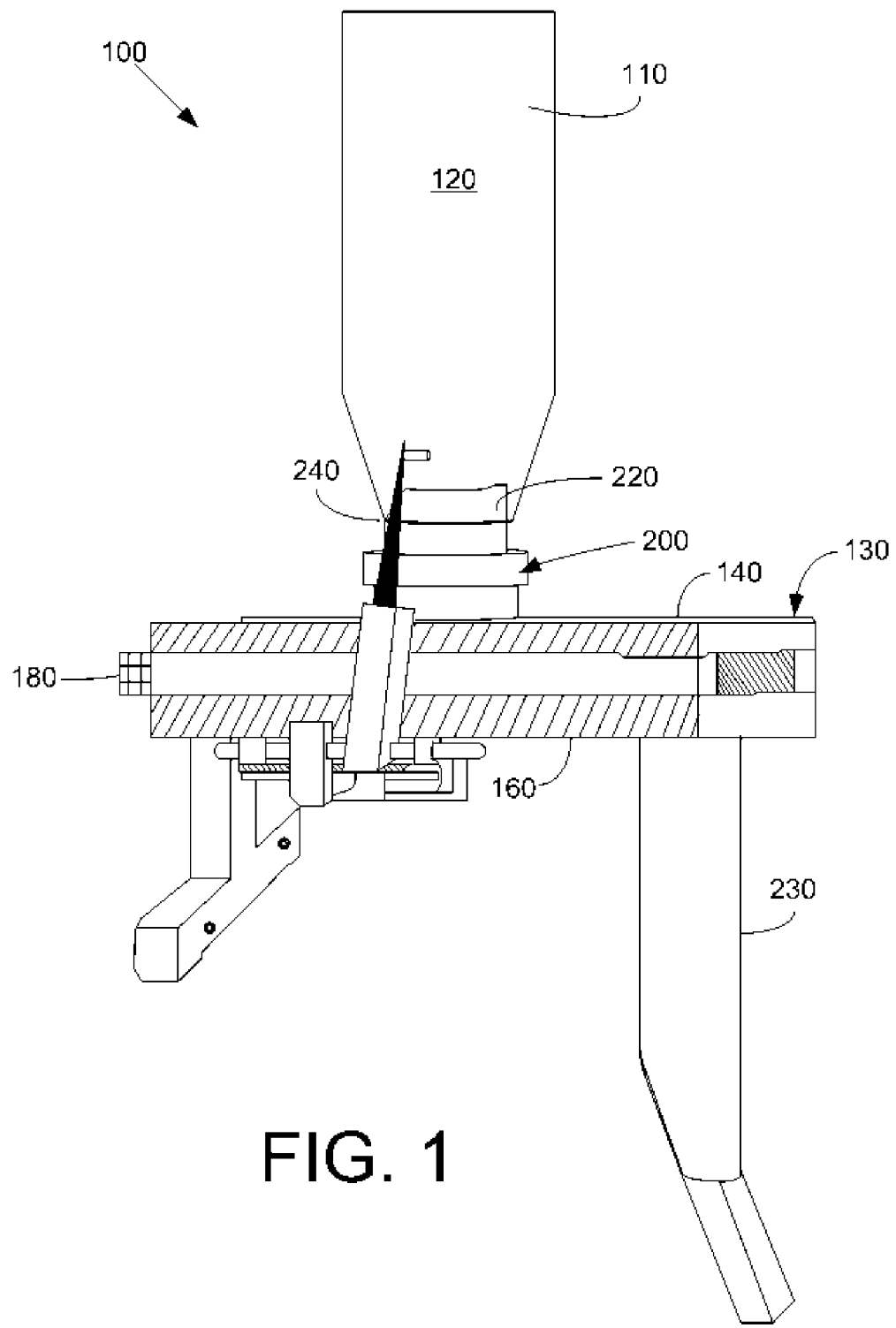
FIG. 1 is a perspective view of an example of a coffee dosing system as is described herein.
Figure 2:
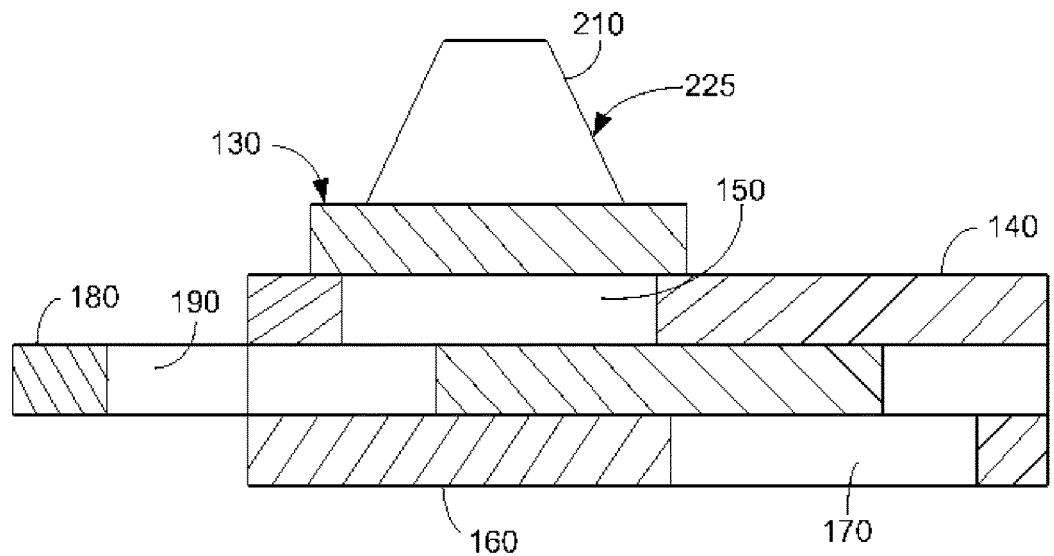
FIG. 2 is a side cross-sectional view of the dosing block of the coffee dosing system of FIG. 1.
Figure 3:
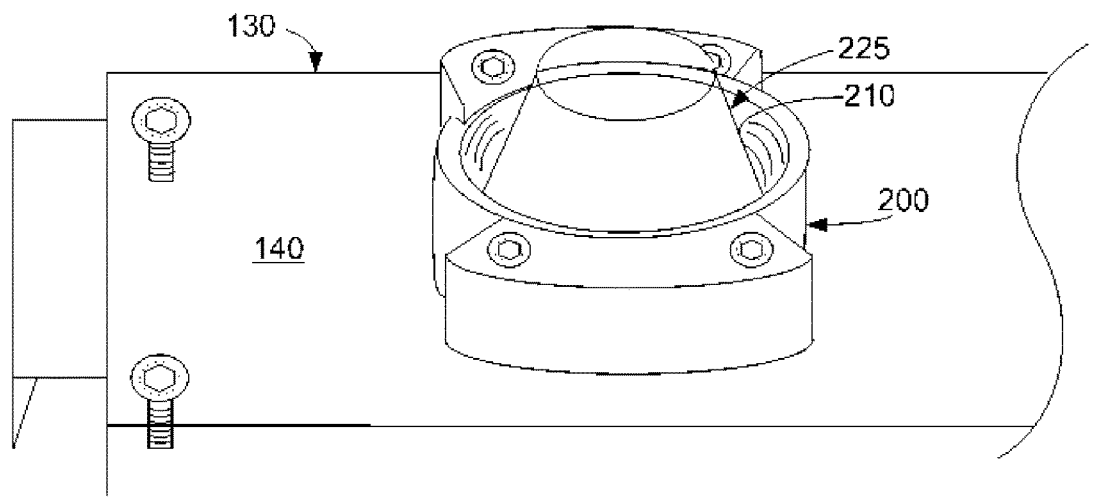
FIG. 3 is a perspective view of a reverse taper coupling of the coffee dosing system of FIG. 1.

Referring now to the drawings, in which like numerals indicate like elements throughout the several views, FIGS. 1 and 2 show a coffee dosing system 100 as is described herein. The coffee dosing system 100 includes a grind bag 110. The grind bag 110 may be made out of a gas impermeable material such as a multilayer composite with foil, an EVOH film (Ethylene Vinyl Alcohol Polymer) or the like, or similar types of materials. The grind bag 110 may be filled with an amount of ground coffee 120. Any other type of brewable or mixable material also may be used herein. In fact, any type of flowable materials or particles may be used herein. The grind bag 120 may be filled with nitrogen or similar gases to preserve the freshness of the ground coffee 120 or other materials therein.

The coffee dosing system 100 also may include a dosing block 130. The dosing block 130 may be made out of plastic, molded or machined, metal, or similar types of materials. The dosing block 130 may include a top side 140 with a first aperture 150 and a bottom side 160 with a second aperture 170. The dosing block 130 further may include a plate 180 slideably positioned therein. The plate 180 may be driven a motor driven cam, a slide assembly, or a similar type of mechanism. The plate 180 may have a dosing aperture 190 positioned therein. The dosing aperture 190 may slide between a first position adjacent to the first aperture 150 of the top side 140 and a second position adjacent to the second aperture 170 of the bottom side 160. The plate 180 may be lubricated by using different materials, a food grade lubricant, or similar means.

The coffee dosing system 100 also may include a coupling mechanism 200. The coupling mechanism 200 may include a male member 210 positioned about the first aperture 150 on the top side 140 of the dosing block 130 and a female member 220 positioned about one end of the grind bag 110. (The respective positions of the members 210, 220 may be reversed as is desired.) The members 210, 220 preferably have a reverse taper 225. In other words, the diameter of the members 210, 220 increases as the members 210, 220 extend from the grind bag 110 towards the first aperture 150. The reverse tapering ensures there is no bridging of the ground coffee 120 such that all of the coffee travels into the dosing aperture 190. The reverse taper 225 also ensures that there is substantially consistent pressure on the ground coffee 120 or other material to ensure repeatable weights. Coffee density also should be substantially consistent. The coffee dosing system 100 also may include an exit conduit 230. The exit conduit 230 may lead to a brewing device (not shown) as is known or elsewhere.

The coffee dosing system 100 further may include one or more vibrating arms 240. The vibrating arms 240 may be positioned about the grind bag 110 adjacent to the coupling mechanism 200. The vibrating arms 240 may be driven by a conventional drive mechanism (not shown) such as such as a cam follower actuated by the slide mechanism, by a separate drive system providing linear motion or vibration motion, or by similar devices. The vibrating arms 240 ensure proper flow of the ground coffee 120 or other materials into the coupling mechanism 200 and the dosing aperture 190 of the dosing block 130.

In use, the ground coffee 120 should stay fresh within the grind bag 110 for up to about one (1) year given a nitrogen flush or similar techniques. The coffee 120 may be ground as desired. Specific coffee grinding techniques are described in commonly owned U.S. patent application Ser. No. 10/908,350, entitled "COFFEE AND TEA POD", incorporated herein by reference. The grind bag 110 is then attached to the dosing block 130 via the coupling mechanism 200. When a brewed beverage is desired, the plate 180 slides such that the dosing aperture 190 is positioned underneath the first aperture 150 of the top side 140 in line with the coupling mechanism 200. As the dosing aperture 190 aligns with the first aperture 150, a measure of the ground coffee 120 falls into the dosing aperture 190. The size, shape, depth and/or the diameter of the dosing aperture 190 may be arranged for the predetermined volume of the ground coffee 120 or other material as required for a particular beverage.

After a predetermined amount of time or other variable, the plate 180 begins to slide towards the second aperture 170 on the bottom side 160 of the dosing block 130. As the plate 180 moves away from the first aperture 150, the grind bag 110 is closed off to oxygen permeation. The only chance for oxygen to enter the grind bag 110 is the brief moment that the dosing aperture 190 is positioned about the first aperture 150. Even in this scenario, however, oxygen can only contact the ground coffee 120 that is about to be used.

The use of the reverse taper 225 in the coupling mechanism 200 again ensures that all of the ground coffee 120 travels to the dosing aperture 190 and that no bridging of the ground coffee 120 occurs. As the dosing aperture 190 aligns with the second aperture 170 on the bottom side 160, the ground coffee 120 falls out of the dosing block 130 and into the exit conduit 230. Depending upon the nature of the desired beverage, multiple doses of the ground coffee 120 or other materials may be dispensed into the exit conduit 230 at one time. The ground coffee 120 then travels toward the brewing device (not shown) or elsewhere. Once the ground coffee 120 is depleted from the grind bag 110, the grind bag 110 may be removed and refilled or replaced.

It should be apparent that the foregoing relates only to the preferred embodiments of the present invention and that numerous changes and modifications may be made herein without departing from the general spirit and scope of the invention as defined by the following claims and the equivalents thereof.

What is claimed is:

1. A material dosing system, comprising:
   a brewable material source with a plurality of brewable material doses therein;
   a dosing block;
   the dosing block comprising a first aperture positioned on a first side of the dosing block and a second aperture positioned on a second side of the dosing block;
   the dosing block further comprising a sliding plate positioned between the first side and the second side, the sliding plate comprising a dosing aperture movable between the first aperture and the second aperture; and
   a coupling connecting the brewable material source and the first aperture of the dosing block;
   the coupling comprising a reverse taper expanding in the direction of the dosing block for a dose of the brewable material to flow therethrough.

2. The dosing system of claim 1, wherein the brewable material source comprises a source of ground coffee.

3. The dosing system of claim 1, wherein the brewable material source comprises a gas impermeable container.

4. The dosing system of claim 1, wherein the brewable material source comprises nitrogen therein.

5. The dosing system of claim 1, wherein dosing aperture comprises a predetermined size.

6. The dosing system of claim 1, wherein the coupling comprises a first member connected to the material source and a second member connected to the dosing block.

7. The dosing system of claim 1, further comprising a vibration system.

8. The dosing system of claim 7, wherein the vibration system comprises a pair of arms positioned about the brewable material source.

9. The dosing system of claim 1, further comprising an exit conduit positioned about the second aperture of the dosing block.

10. A coffee dosing system, comprising:
    a coffee source with a plurality of coffee doses therein;
    a dosing block;
    the dosing block comprising a first aperture positioned on a first side of the dosing block and a second aperture positioned on a second side of the dosing block;
    the dosing block further comprising a sliding plate positioned between the first side and the second side, the sliding plate comprising a dosing aperture movable between the first aperture and the second aperture; and
    a coupling connecting the coffee source and the first aperture of the dosing block;
    the coupling comprising a reverse taper expanding in the direction of the dosing block a coffee dose to flow therethrough.

11. The dosing system of claim 10, wherein the coffee source comprises a gas impermeable container.

12. The dosing system of claim 10, further comprising a vibration system.

13. The dosing system of claim 12, wherein the vibration system comprises a pair of arms positioned about the coffee source.

14. A method of dosing a predetermined amount of coffee grinds, comprising;
   storing the coffee grinds;
   flowing the predetermined amount of the coffee grinds into a reverse taper coupling expanding in a direction of the dosing block;
   flowing the predetermined amount of the coffee grinds into a dosing aperture; and
   sliding the predetermined amount of coffee grinds within the dosing aperture from a first position to a second position.

15. The method of claim 14, wherein the storing step comprises storing the coffee grinds in an air impermeable container.

16. The method of claim 14, wherein the first position comprises a storage position and the second position comprises an exit position.

17. The method of claim 14, further comprising the step of vibrating the coffee grinds.

18. The method of claim 14, further comprising a plurality of flowing and sliding steps.

* * * * *